Patented Apr. 28, 1925.

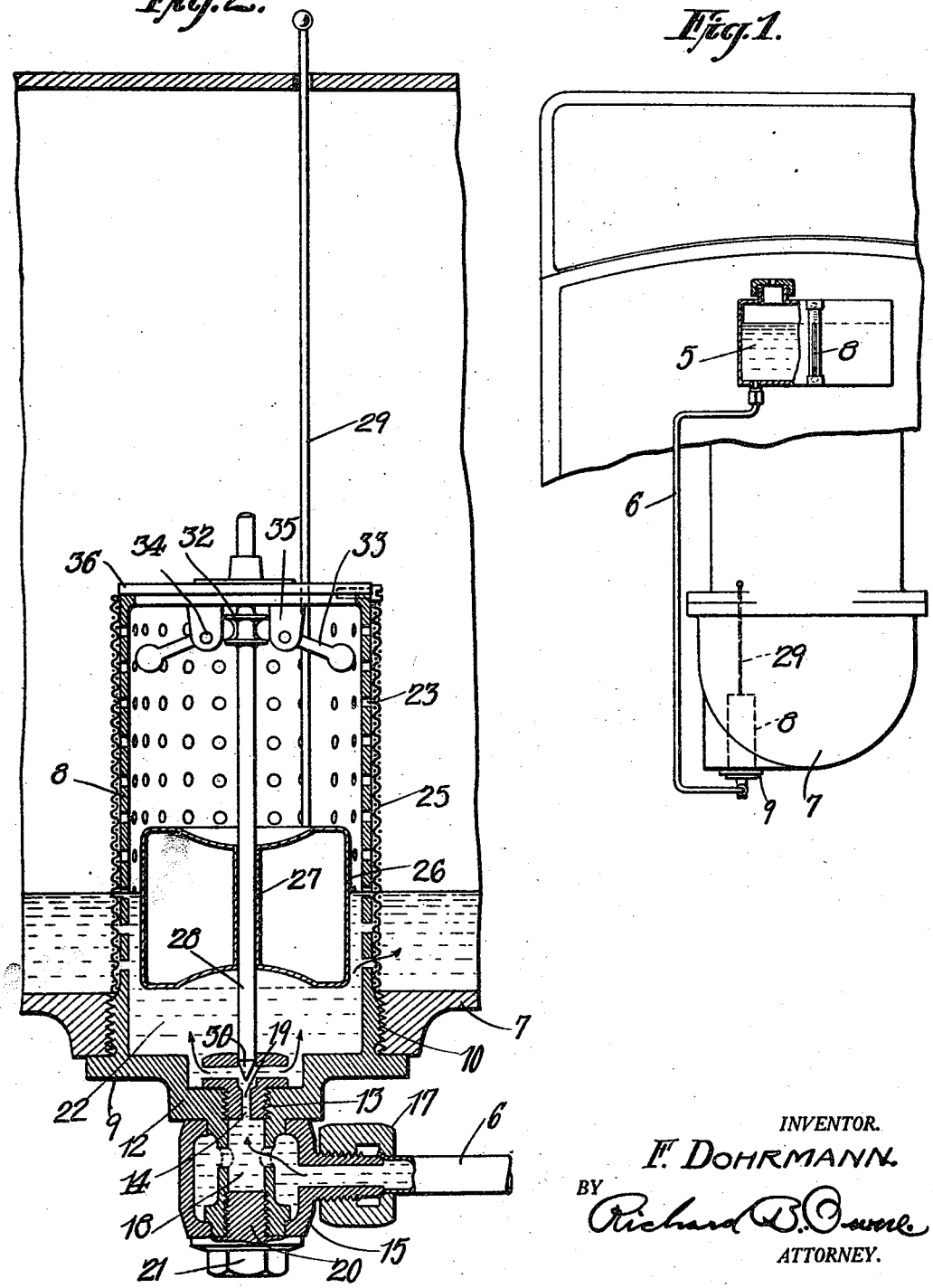

1,535,110

UNITED STATES PATENT OFFICE.

FRED DOHRMANN, OF NEW YORK, N. Y.

SELF OILER.

Application filed May 21, 1923. Serial No. 640,519.

*To all whom it may concern:*

Be it known that I, FRED DOHRMANN, a citizen of the Republic of Germany, residing at New York, in the county of New York and State of New York, have invented certain new and useful Improvements in Self Oilers, of which the following is a specification.

This invention relates to a combined oil strainer and automatic cut-off valve and more particularly to a novel and improved device attachable to the crank case of an internal combustion engine whereby the quantity of oil may be ascertained and kept at a predetermined height.

One of the objects of my invention is to provide a combined oil strainer and float operated cut-off valve adapted to be positioned within the crank case of an internal combustion engine such as a motor truck, including provision for ascertaining the level of oil in the crank case by the position of the float or from the main supply tank.

A further and continued object of my invention is to provide a combined oil strainer and automatic cut-off valve therefor which is extremely simple in construction, easily assembled, highly efficient in operation and use, practical, durable, and otherwise capable of being manufactured at an extremely low cost, whereby its commercial possibilities are greatly enchanced.

To enable others skilled in the art to fully comprehend the underlying features of my invention that they may embody the same in the various modifications in structure and relation contemplated, drawings depicting a preferred form have been annexed as a part of this disclosure and in such drawings, similar reference characters denote corresponding parts throughout all the views, of which, Figure 1 is a view showing the connection between the supply tank and the crank case of a conventional type of motor vehicle.

Figure 2 is an enlarged detail sectional view showing my invention as attached within the crank case.

Referring now to the drawings, wherein like reference characters designate corresponding parts throughout the several views, 5 designates the main supply tank of a motor vehicle, which is positioned preferably adjacent the dash board and 6, a pipe or lead connected to the bottom thereof and extending to the crank case 7, as shown by Figure 1. An oil indicator 8ª on the main tank 5, is provided whereby the level of the oil may be ascertained by the driver.

My invention proper, consists of a cylindrical chamber 8 having an annular flanged bottom 9 and threaded externally as indicated at 10 whereby the chamber may be screwed tightly within the crank case of a motor vehicle. The annular bottom 9, above referred to is provided with an extension 12, which extension is internally threaded as at 13 to receive a valve 14, threaded therein. A coupling 15, connected to the conduit or pipe 6 by the nut 17, communicates with the interior chamber 18, leading to the restricted passage 19 of the valve 20, the latter being secured therein by the nut 21 as clearly shown by Figure 2 of the drawings. The oil, passing through the conduit 6 through the chamber 18 and to the interior chamber 22 of the cylinder flows into the interior of the crank case through the radially disposed apertures 23 of the cylinder and in order to prevent the passage of any foreign matter or dirt, a screening 25 is secured exteriorly of the cylinder for the obvious purpose. A float 26 provided with a central passage 27 to permit of the movement of a valve stem 28, rises and falls with the introduction and consumption of the oil, said float being secured and attached to the lower end of a rod 29, the latter extending through the top of the crank case where the position thereof may be observed by the operator of the machine and the level of the liquid ascertained. The valve stem 28 is provided with a needle point 30 at its lower end and adapted to seat within the valve seat, above referred to, when the maximum quantity of oil is introduced within the crank case. To that end and purpose, the upper end of the stem 28 is provided with a grooved collar 32, which receives the inner ends of the counterweights or levers 33, pivotally connected as at 34 to the ears 35, depending from the top 36 of the cylinder. As the float 26 rises and engages the outer ends of the weights 33, it will be seen that the valve stem 28 will be moved downwardly and seated, thus cutting off the admission of oil to the crank case. On the other hand, as the oil is being consumed and the float drops, the valve stem will be unseated to permit of the passage of the oil from the main tank 5 as above set forth.

While I have illustrated and described my invention with some degree of particularity, I realize that in practice various alterations therein may be made. I therefore reserve the right and privilege of changing the form of the details of construction or otherwise altering the arrangement of the correlated parts, without departing from the spirit of the invention or the scope of the appended claim.

Having thus described my invention what I claim as new and desire to secure by United States Letters Patent is:—

The combination with a motor crank case, having a threaded opening therein, a removable chamber, perforated throughout its length extending within the casing, a flange formed on the bottom of said chamber to engage the bottom of the motor case, screens surrounding the openings in the chamber, a duct connecting the chamber with a source of supply, a valve in the bottom of said chamber for regulating the flow of a liquid though the duct, a valve stem and float within the casing, a pair of weighted elements depending from the top of the casing, the inner ends of said weighted elements engaging the valve stem to lower the same when said weighted elements are engaged by the float and means to determine the position of said float within the chamber.

In testimony whereof I affix my signature.

FRED DOHRMANN. [L. S.]